C. L. SUTTON.
PNEUMATIC CUSHIONING DEVICE FOR VEHICLES.
APPLICATION FILED AUG. 26, 1911.
1,064,395.
Patented June 10, 1913.
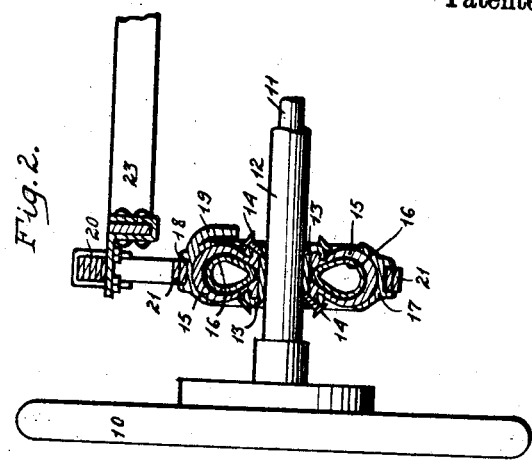
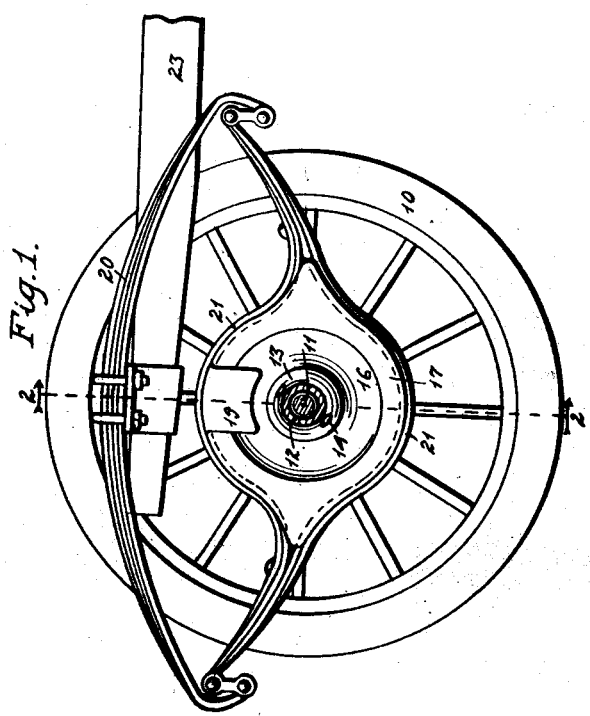
Witnesses.
Inventor.
Chas. L. Sutton.

UNITED STATES PATENT OFFICE.

CHARLES L. SUTTON, OF OAKLAND, IOWA.

PNEUMATIC CUSHIONING DEVICE FOR VEHICLES.

1,064,395.     Specification of Letters Patent.     Patented June 10, 1913.

Application filed August 26, 1911. Serial No. 646,106.

*To all whom it may concern:*

Be it known that I, CHARLES L. SUTTON, a citizen of the United States, residing at Oakland, in the county of Pottawattamie and State of Iowa, have invented a certain new and useful Pneumatic Cushioning Device for Vehicles, of which the following is a specification.

The object of my invention is to provide a pneumatic cushioning device for vehicles of simple, durable and inexpensive construction, built in compact form which may be applied to any kind of vehicles and is applied to the axles.

A further object is to provide such a device which may be used with any kind of tires and in combination with springs.

A further object is to provide a form of spring forming a part of my device and readily adapted thereto.

A further object is to provide such a device which employs a pneumatic cushion around the axle casing and suitable rims for such cushion, said rims being adapted for being secured to the spring.

My invention consists in certain details in the construction, arrangement and combination of the various parts of the device, whereby the objects contemplated are attained, as hereinafter more fully set forth, pointed out in my claim and illustrated in the accompanying drawings, in which—

Figure 1 shows a side elevation of a part of a vehicle equipped with a pneumatic cushioning device, embodying my invention, the axle and the casing therefor being shown in section. Fig. 2 shows a central, vertical, sectional view of my improved cushioning device taken on the line 2—2 of Fig. 1.

In the accompanying drawings, I have used the reference numeral 10 to indicate the wheel of a vehicle which may be equipped with any form of tire desired. The wheel 10 is mounted on the axle 11 which is contained within a casing 12. Mounted on the casing 12 is a rim 13 of any desired form adapted to hold a pneumatic tire. The rim 13 may be secured against longitudinal movement of the casing 12 by means of screws 14. Mounted in the rim 13 is an ordinary pneumatic tire casing 15 in which is an inner tube 16. Surrounding the outer circumference of the tire casing 15 is an outer rim 17 which is provided with a central, longitudinal, outer groove 18. On one side of the upper half of the rim 17 is a downwardly extending plate 19, the lower edge of which is spaced apart from the axle casing 12. The purpose of the plate 19 is to limit the movement of the upper half of the rim 17 and the part contained therein toward the axle.

The parts heretofore described, are mounted on the frame of the vehicle by means of a spring 20 which is preferably an ordinary elliptical leaf spring, the leaves 21, of the lower half of which, are spread apart from each other to inclose between them the rim 17. The leaves 21 fit in the groove 18 formed in the rim 17.

My improved pneumatic cushioning device is attached to a vehicle by mounting the rim 13 in the proper place on the axle casing 12. The screws 14 are then inserted to prevent lateral movement of the rim 13 on said axle case. The pneumatic tire is mounted in the rim 13 in the ordinary way. The outer rim 17 is then fastened around the casing 15 of the pneumatic tire. The spring 20 is then mounted on the rim 17 and on the frame 23 of the vehicle.

My improved pneumatic cushioning device has the advantage of cushioning at the point where the frame is mounted on the axle, in addition to any ordinary cushioning device that may be used on the vehicle. Its simplicity of construction is obvious. It may be used advantageously as a substitute for pneumatic tires in regions where, on account of the condition of the roads or other causes pneumatic tires are impracticable. The form of construction by which the spring is secured to the outer rim is believed to be novel and valuable.

I claim as my invention:

In a device of the class described, the combinaion of an axle, a casing therefor, a rim mounted on said casing, a pneumatic tube on said rim, an outer rim mounted on said tube, provided with a groove, a leaf spring having its upper and lower leaves separated to receive the outer rim between them, the leaves being received in the groove in said outer rim, said spring being designed to be mounted on the body of a vehicle.

Des Moines, Iowa, August 17, 1911.

CHARLES L. SUTTON.

Witnesses:
  F. A. NASH,
  C. C. KIETH.